Patented Feb. 6, 1951

2,540,486

UNITED STATES PATENT OFFICE 2,540,486

TRI-IODIDE OF BETA-AMYLOSE PREPARED WITH IODINE VAPOR

Wallace L. Minto, East Orange, N. J.

No Drawing. Application June 13, 1947,
Serial No. 754,604

5 Claims. (Cl. 260—209)

In my prior Patent #2,383,334, dated August 21, 1945, I disclose a process for the production of tri-iodide beta amylose using a suitable solvent, the resultant product being a liquid and the tri-iodide of beta amylose having the formula $(C_{36}H_{60}O_{30}I_3)_2$.

The instant application is directed to a process for the production of the aforesaid tri-iodide amylose in dry or powdered form which has certain advantages over the liquid form, among which are: The elimination of liquid containers, ease in handling and shipment, and ease in dispensing as the material may be dispensed in capsules.

A further object is to produce a powdered form of tri beta amylose particularly well suited for use in agriculture and for use in animal and poultry husbandry.

The powder may, however, be used for all of the uses mentioned in the aforesaid patent.

I have found that amylose will react with iodine vapor when they are present together. However, to produce the tri-iodide, a temperature should be greater than 65° C., and the higher the temperature, the more rapid is the reaction.

At higher temperatures, there is a contemporaneous reaction which is undesirable. This unwanted reaction, which progresses at a substantial rate at 100° C. is a splitting or a degradation of the molecule. Thus, the amylose-iodine vapor reaction should be so carried out as to offer the most favorable conditions for the iodination reaction while offering the least favorable conditions for splitting the amylose molecules.

The most favorable temperature for this reaction is apparently at a temperature of 80–90° C. when the iodination reaction rate is substantial but the amylose splitting reaction rate is small. A reaction time of from two to three hours is satisfactory at 85° C.

The reaction is such that the compound of formula $(C_{36}H_{60}O_{30}I_3)_2$, may be produced which corresponds to a 27–28% iodine content in the resultant product.

Because of the presence of the molecule splitting reaction which removes amylose and thus prevents its reaction with iodine, in practise, when the two materials are mixed as hereinafter described, they may be mixed in such proportions as to result in a final product containing 25% iodine.

The presence of inert impurities in beta amylose may be allowed for by increasing the ratio of crude amylose to iodine over that necessary for complete reaction.

Thus, the impurities are further allowed for by further reducing the proportion of iodine added so that the final product may contain 20% by weight of iodine.

The iodine vapor may be introduced to the amylose in any suitable manner, such for example, in accordance with the method to be presently described or by placing the amylose in a closed vessel into which iodine vapor is introduced from an outside source until the air above the amylose is driven out of the vessel, the space above the amylose being filled with iodine vapor which is continually forced into and withdrawn from the vessel until the process is complete.

I give the following as an example of one method for the production of the compound of my invention.

A quantity of amylose, which is as pure as is obtainable, (at least 70% pure and free from fats and fatty acids) is mixed with exactly one fourth of its weight of ground crystals of pure elemental iodine.

The mixture may be placed in a vessel of glass or any other material resistant to the action of iodine or iodine vapor.

The vessel is evacuated to remove most of the air and allow free circulation of iodine vapors. A water aspirator produces sufficient vacuum for this purpose.

The evacuated vessel is then sealed and completely immersed in a water or other liquid bath heated to 85° C. The vessel is left in the heated bath maintained at the aforesaid temperature for two or three hours.

The vessel is then allowed to cool slowly and uniformly (preferably in the bath which is allowed to cool also) until the temperature of the contents is less than 40° C. and the product is then removed from the vessel.

The above example is given as one method of producing this compound of my invention and is not given as the sole method of its production.

The powdered tri-iodide of beta amylose made by the above method forms a true solution in water, is dialyzable, and the solution selectively absorbs wave lengths above 5500 angstrom units, the band of strongest absorption being between 5650 and 6100 angstrom units and has the following formula:

$$(C_{36}H_{60}O_{30}I_3)_2$$

The completeness of the reaction between the amylose and the iodine vapors can be quickly determined, (which also enables the length of the heating period to be ascertained) by an inspection of the powder. If the reaction is not complete, when some of the powder is mixed with water, free iodine will be precipitated. On the other hand, if the reaction is complete, the powder forms a true solution and there is no precipitation.

I do not limit myself to the particular steps of the procedure as herein set forth, as these are given solely for the purpose of defining my invention.

What I claim is:

1. A process for the production of tri-iodide of beta amylose comprising reacting one mole of beta amylose with three moles of iodine in iodine vapor while subjected to heat in excess of 65° C.

2. A process for the production of tri-iodide of beta amylose comprising the subjection of beta amylose and elemental iodine to heat in excess of 65° C. while in a partial vacuum whereby iodine vapor arising from said iodine may surround the amylose and combine therewith.

3. The method of producing $(C_{36}H_{60}O_{30}I_3)_2$ which comprises the steps of reacting amylose and elemental iodine in a partial vacuum, and, while subjecting said mixture to heat, to vaporize the iodine, whereby said vapor may combine with the amylose.

4. The method of producing $(C_{36}H_{60}O_{30}I_3)_2$ which comprises the steps of reacting amylose and elemental iodine in a partial vacuum, and, while subjecting said mixture to heat of from 65° C. to 100°, to vaporize the iodine, whereby said vapor may combine with the amylose.

5. The method of producing $(C_{36}H_{60}O_{30}I_3)_2$ which comprises the steps of reacting amylose and elemental iodine in a closed vessel forming a vapor space, evacuating said vessel sufficiently to permit iodine vapor to circulate in said space, heating said vessel to produce said iodine vapor, and allowing said vessel and contents to cool slowly to below 40° C.

WALLACE L. MINTO.

REFERENCES CITED

The following references are of record in the file of this patent:

UNITED STATES PATENTS

| Number | Name | Date |
|---|---|---|
| 2,383,334 | Minto | Aug. 21, 1945 |

OTHER REFERENCES

Stocks, Chem. News, vol. 57 (1888), page 183, 1 page.

Leroy, Phil., Mag., vol. 4, 3rd Ser. (1834), page 313, 1 page.

Baldwin et al., Jour. Amer. Chem. Soc., vol. 66, pp. 111–115 (1944).